United States Patent [19]

Simplicean et al.

[11] Patent Number: 5,685,591

[45] Date of Patent: Nov. 11, 1997

[54] MODULAR VEHICLE PACKAGE TRAY

[75] Inventors: Ionel Eugene Simplicean, Dearborn Heights; Philip Anthony Langran, Northville, both of Mich.

[73] Assignee: Ford Motor Company, Dearborn, Mich.

[21] Appl. No.: 364,569

[22] Filed: Dec. 17, 1994

[51] Int. Cl.$^6$ ...................................................... B60R 7/04
[52] U.S. Cl. ........................................ 296/37.16; 224/275
[58] Field of Search .............................. 296/37.16, 37.8; 224/275, 542, 539, 540, 543

[56] References Cited

U.S. PATENT DOCUMENTS

| | | | |
|---|---|---|---|
| 3,993,345 | 11/1976 | Croup | 296/37.16 |
| 5,076,631 | 12/1991 | Lord | 296/37.8 |
| 5,171,054 | 12/1992 | Wilson. | |
| 5,498,050 | 3/1996 | Maruyama et al. | 296/37.16 |

FOREIGN PATENT DOCUMENTS

405178142 A  7/1993  Japan .................................. 296/37.8

*Primary Examiner*—Gary C. Hoge
*Attorney, Agent, or Firm*—Damian Porcari

[57] ABSTRACT

A package tray for a motor vehicle comprises a generally planar first surface element, a second surface element substantially parallel and attached to the first surface element having an access surface exposed to the trunk of the motor vehicle, a cavity formed in the access surface for receiving an electronic module, a sealed resonance chamber for improved acoustical performance, and fasteners for releasably affixing the electronic modules in the cavity.

8 Claims, 1 Drawing Sheet

MODULAR VEHICLE PACKAGE TRAY

FIELD OF THE INVENTION

The present invention relates to a vehicle package tray. More particularly, the invention is directed to a package tray for a motor vehicle including, inter alia, at least one cavity for receiving an electronic module.

BACKGROUND OF THE INVENTION

Modern motor vehicles generally include a package tray mounted on the automobile body structure between the rear seat back and the rear window. Such package trays typically are sufficiently rigid and strong to support small articles placed thereon as well as support and house a rear center high-mounted stop lamp, a set of acoustical speakers, with a sealed resonance chamber, various storage compartments, and the like. Electrical wiring for activating the stop lamp and speakers is generally routed through the interior of the package tray, or beneath the package tray within the trunk of the vehicle.

U.S. Pat. No. 5,171,054 discloses a package tray for a motor vehicle incorporating transverse reinforcing channels through which electrical cables connected to the stop lamp and audio speakers are routed.

It is also well-known that modern motor vehicles contain various electronic modules dispersed throughout the vehicle. Many times, these electronic modules are positioned in locations which are difficult to access in order to assemble, test, repair, or replace them.

It must be noted that the prior art referred to hereinabove has been collected and examined only in light of the present invention as a guide. It is not to be inferred that such diverse art would otherwise be assembled absent the motivation provided by the present invention, nor that the cited prior art, when considered in combination, suggests the present invention absent the teachings herein.

It would be desirable to take advantage of the ease of accessibility and modular characteristic of an automobile package tray in determining the location and configuration for installing electronic modules within a modern motor vehicle.

SUMMARY OF THE INVENTION

Accordant with the present invention, a motor vehicle package tray which provides ease of access to one or more electronic modules has surprisingly been discovered. The package tray comprises:

a generally planar first surface element extending substantially to the periphery of the package tray, said first surface element including a finish surface adapted to be exposed to the passenger compartment of the motor vehicle when the package tray is installed therein;

a generally planar second surface element substantially parallel and attached to the first surface element, said second surface element including an access surface adapted to be exposed to the trunk of the motor vehicle when the package tray is installed therein;

a cavity forward in the access surface of the second surface element for receiving an electronic module; and fastening means, for releasably affixing the electronic module to the cavity.

DETAILED DESCRIPTION OF THE PREFERRED EMBODIMENT

Figure 1:
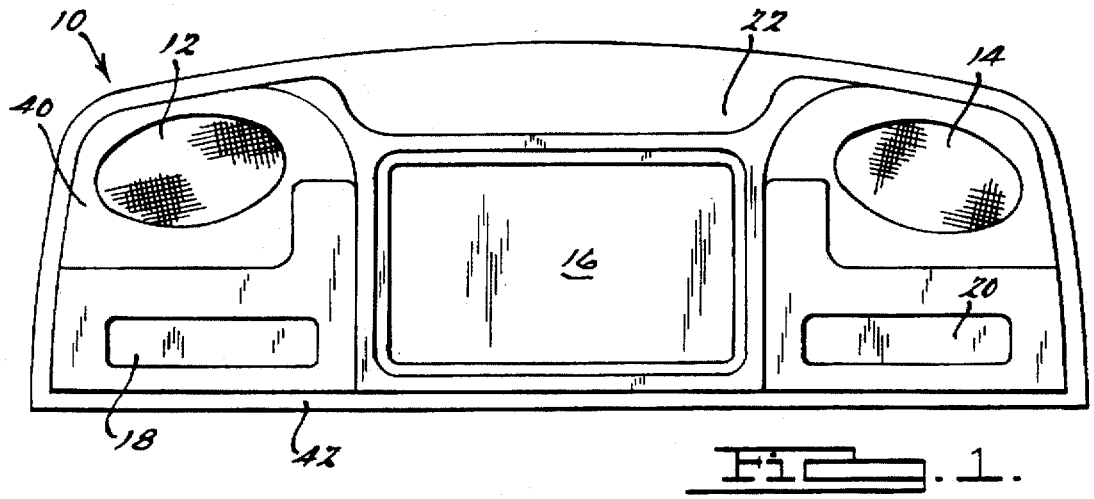
FIG. 1 is a plan view of a package tray embodying the features of the present invention.

Referring now to the Drawings, and particularly to FIG. 1, there is shown generally at 10 a package tray embodying the features of the present invention. The upper surface of the package tray 10 includes conventional features such as, for example, speaker grills 12 and 14, a storage bin 16, additional receptacles 18 and 20 for storing convenience items such as a flashlight and folding umbrella, and a recess 22 for mounting a center high-mounted stop lamp. Moreover, this upper surface of the package tray 10 may be at least partially covered with a decorative fabric or embossed finish material (not specifically shown).

Figure 2:
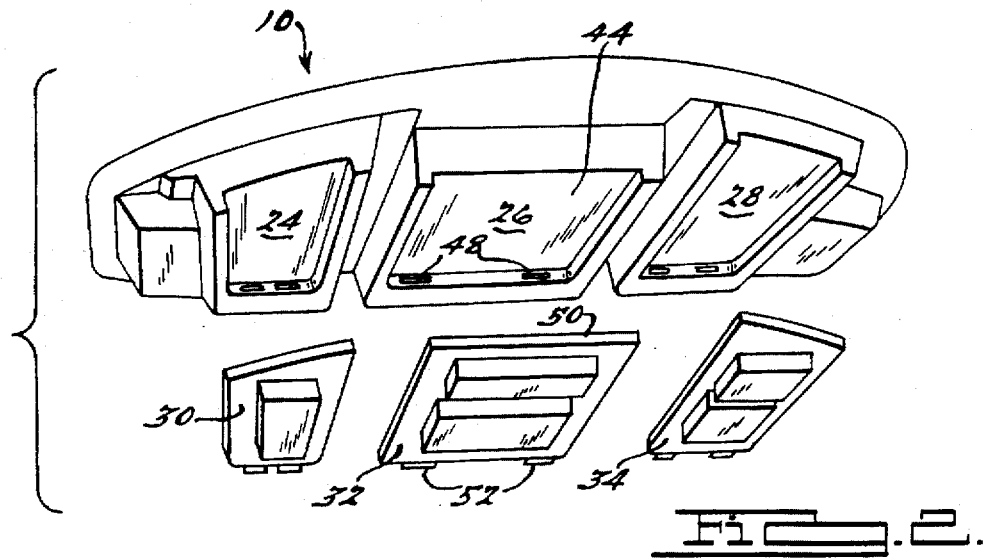
FIG. 2 is a perspective view of the access surface of the package tray of FIG. 1 with the rear walls of the cavities removed for clarity.

As seen in FIG. 2, the underside of the package tray 10 includes cavities 24, 26, and 28 for receiving electronic modules 30, 32, and 34, respectively, as will be explained in further detail hereinafter.

Figure 3:
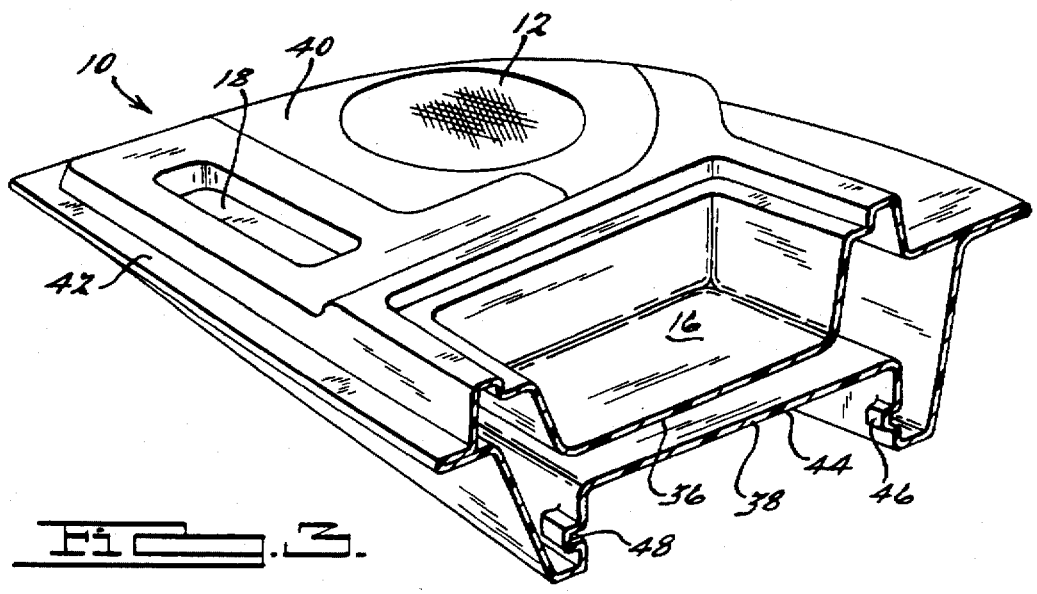
FIG. 3 is a perspective, cross-sectional view of the package tray of FIGS. 1 and 2.

Referring now to FIG. 3, the package tray 10 comprises a first surface element 36 and a second surface element 38. These surface elements 36 and 38 may be prepared from conventional plastic materials such as, for example, polypropylene using any conventional molding technique. A preferred method for manufacturing the first and second surface elements 36 and 38 is by blow molding, a well-known forming process.

The first and second surface elements 36 and 38 are generally planar in configuration. Despite the fact that the surface elements 36 and 38 contain surface irregularities, such as the storage bin 16, receptacles 18 and 20, a recess 22, and cavities 24, 26, and 28, the surface elements 36 and 38 generally lie in substantially parallel, horizontal planes when the package tray 10 is installed between the seat back and rear window of a motor vehicle.

The first surface element 36 includes a finish surface 40 which comprises substantially the entire upper surface of the package tray as illustrated in FIGS. 1 and 2. The first surface element 36 extends in a generally planar fashion substantially to the periphery of the package tray 10. As is readily apparent in FIG. 3, a flange 42 extends around the peripheral marginal edge of the package tray 10 for ease of mounting the package tray 10 into the automotive vehicle body structure. The finish surface 40 of the first surface element 36 is exposed to the passenger compartment of the motor vehicle when the package tray 10 is installed therein, as is well-known in the art.

The second surface element 38 of the package tray 10 extends in a generally planar fashion, substantially parallel and attached to the first surface element 36. The second surface element 38 includes an access surface 44 which is exposed to the trunk of the motor vehicle when the package tray 10 is installed therein.

Cavities 24, 26, and 28 are formed in the access surface 44 of the second surface element 38, for receiving conventional electronic modules 30, 32, and 34, respectively. Examples of the types of electronic modules which are conventionally used in motor vehicles include, but are not necessarily limited to, audio system amplifiers, telephone transceivers, electronic relays, shock dampening modules, anti-lock brake control modules, radio receiver modules, compass/navigation modules, and the like, as well as combinations thereof. Although FIG. 2 specifically illustrates three electronic modules and three cavities, the present invention contemplates any number of electronic modules and cavities; but at least one module and corresponding cavity.

The present invention furthermore includes fastening means, for releasably affixing the electronic modules into their corresponding cavities. The fastening means illustrated in FIGS. 2 and 3 comprises a plurality of tabs 46 and slots 48 formed in the access surface 44 of the second surface element 38, and a corresponding edge 50 and lugs 52 on the electronic modules. To releasably affix the electronic module 32 into the cavity 26, the lugs 52 of the electronic module 32 are inserted into the slots 48, and the module is rotated toward the access surface 44 until the edge 50 of the module 32 is forced past the tabs 46, so that the module 32 is urged tightly against and in intimate contact with the access surface 44 within the cavity 26. As will be readily apparent to those ordinarily skilled in the art, any conventional fastening means, such as a screw or bolt, press pins, retainer clips, etc. (not specifically shown) may be used and will have the same operability and utility as the fastening means specifically illustrated in the figures. The electronic modules 30, 32, and 34 may easily be accessed via the trunk cavity of the motor vehicle for removal, repair, or replacement.

While certain representative embodiments and details have been shown for the purpose of illustrating the present invention, it will be readily apparent to those ordinarily skilled in the art that various changes in uses and applications can be made therein, and that the invention may be practiced otherwise than as specifically illustrated and described, without departing from its spirit and scope.

What is claimed is:

1. A package tray for a motor vehicle, comprising:

a generally planar first surface element extending substantially to the periphery of the package tray, said first surface element including a finish surface adapted to be exposed to the passenger compartment of the motor vehicle when the package tray is installed therein;

a generally planar second surface element substantially parallel and attached to the first surface element, said second surface element including an access surface adapted to be exposed to the trunk of the motor vehicle when the package tray is installed therein;

a cavity formed in the access surface of the second surface element for receiving an electronic module; and fastening means, for releasably affixing the electronic module to the cavity.

2. The package tray according to claim 1, further including a flange extending around the peripheral marginal edge of the package tray.

3. The package tray according to claim 1, wherein the first surface element includes an audio speaker grill.

4. The package tray according to claim 1, wherein the first surface element includes a storage bin.

5. The package tray according to claim 1, wherein the first surface element includes a receptacle.

6. The package tray according to claim 1, wherein the first surface element includes a recess for a center high-mounted stop lamp.

7. The package tray according to claim 1, including a plurality of cavities.

8. The package tray according to claim 7, including a plurality of electronic modules.

* * * * *